(12) United States Patent
Wentworth et al.

(10) Patent No.: US 8,769,756 B2
(45) Date of Patent: *Jul. 8, 2014

(54) VEHICLE TIRE COATING APPARATUS

(75) Inventors: Robert J. Wentworth, Farmington Hills, MI (US); Lionel Belanger, Northville, MI (US)

(73) Assignee: Motor City Wash Works, Inc., Northville, MI (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/252,040

(22) Filed: Oct. 3, 2011

(65) Prior Publication Data

US 2013/0081569 A1   Apr. 4, 2013

Related U.S. Application Data

(63) Continuation of application No. 11/961,862, filed on Dec. 20, 2007, now Pat. No. 8,424,480.

(60) Provisional application No. 60/888,422, filed on Feb. 6, 2007.

(51) Int. Cl.
  *B05C 1/06* (2006.01)
  *B60S 3/04* (2006.01)

(52) U.S. Cl.
  USPC .......... 15/53.4; 15/97.3; 15/DIG. 2; 118/244; 118/255; 118/264; 118/268

(58) Field of Classification Search
  USPC ......... 15/53.1, 53.2, 53.3, 53.4, 97.3, DIG. 2; 118/241, 242, 243, 244, 245, 246, 247, 118/248, 249, 255, 256, 264, 268
  See application file for complete search history.

(56) References Cited

U.S. PATENT DOCUMENTS

| | | | |
|---|---|---|---|
| 3,679,134 A | 7/1972 | Nixon | |
| 4,110,861 A * | 9/1978 | Pecora | 15/53.4 |
| 4,338,698 A * | 7/1982 | Beer et al. | 15/230.16 |
| 4,424,823 A | 1/1984 | Gougoulas | |
| 4,553,702 A | 11/1985 | Coffee et al. | |
| 4,830,033 A | 5/1989 | Hanna | |
| 4,985,957 A | 1/1991 | Belanger et al. | |
| 5,125,981 A | 6/1992 | Belanger et al. | |
| 5,127,123 A * | 7/1992 | Belanger | 15/53.4 |
| 5,167,044 A | 12/1992 | Belanger et al. | |
| 6,383,295 B1 | 5/2002 | Frederick, Jr. et al. | |
| 6,461,685 B2 | 10/2002 | Gorra | |
| 6,485,212 B1 | 11/2002 | Bomgaars et al. | |
| 6,936,104 B2 | 8/2005 | Gorra | |
| 6,939,405 B2 | 9/2005 | Mattia et al. | |
| 8,215,259 B2 * | 7/2012 | Tognetti et al. | 118/264 |

(Continued)

*Primary Examiner* — Randall Chin
(74) *Attorney, Agent, or Firm* — Quinn Law Group, PLLC

(57) ABSTRACT

A tire coating apparatus for applying fluid to vehicle tires in a vehicle washing system, includes a pair of mechanical applicators, which each have at least one coating applicator disposed thereon for contacting the vehicle tires to apply the fluid. One mechanical applicator is intended to engage the tires on a right side of a vehicle while the other mechanical applicator is intended to engage the tires on a left side of the vehicle. The mechanical applicators also include a guide portion for guiding the vehicle wheel when a patron had elected not to have a coating fluid applied to the vehicle wheels. The mechanical applicators are rotatable between an initial position where the coating applicators are in a non-coating position to a second position where the coating applicators are intended to contact a vehicle tire.

25 Claims, 10 Drawing Sheets

(56) References Cited

U.S. PATENT DOCUMENTS

| | | |
|---|---|---|
| 2004/0173242 A1 | 9/2004 | Ballard et al. |
| 2008/0178402 A1* | 7/2008 | Martines et al. ............... 15/53.2 |
| 2008/0187674 A1 | 8/2008 | Wentworth |

* cited by examiner

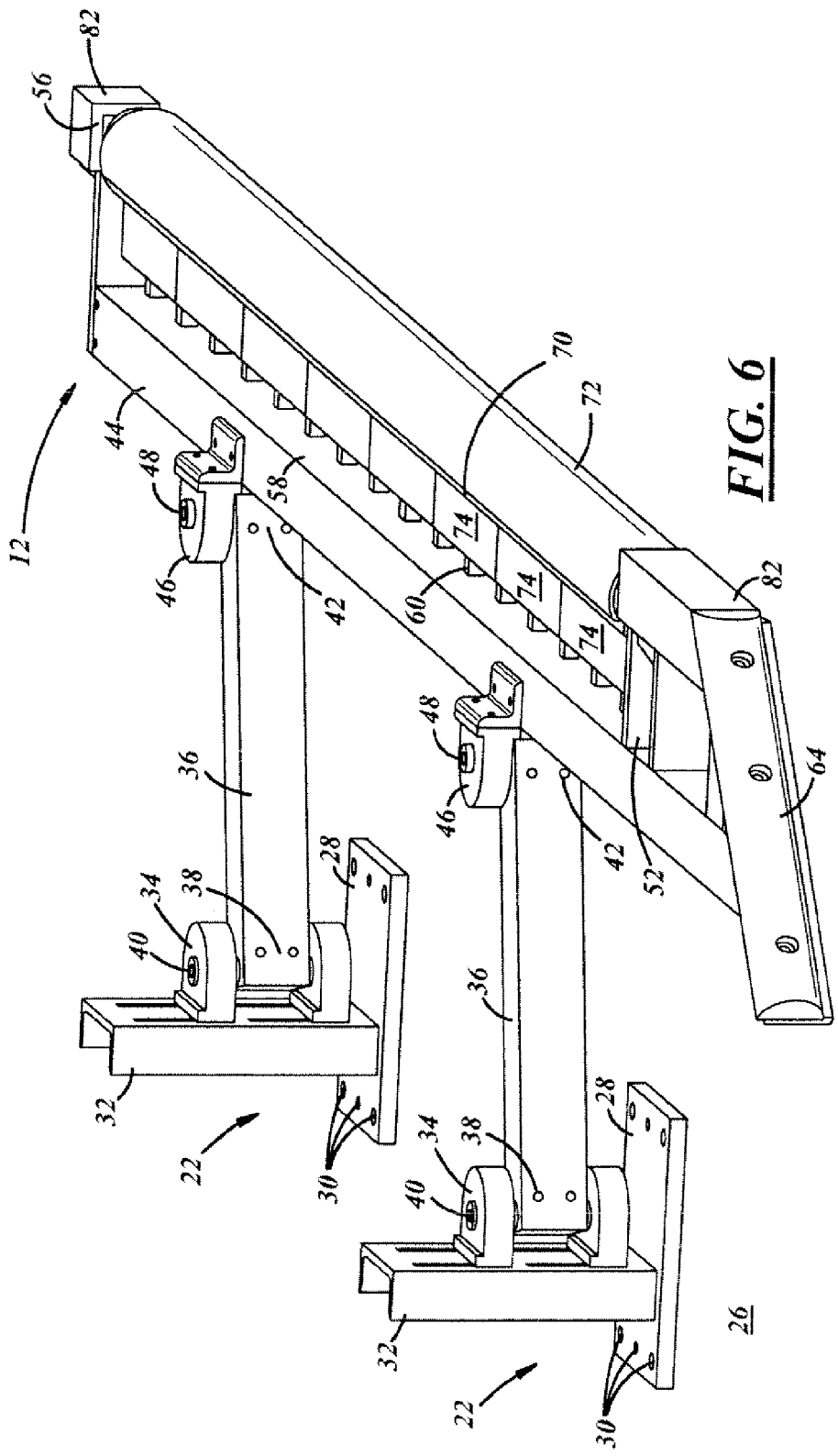

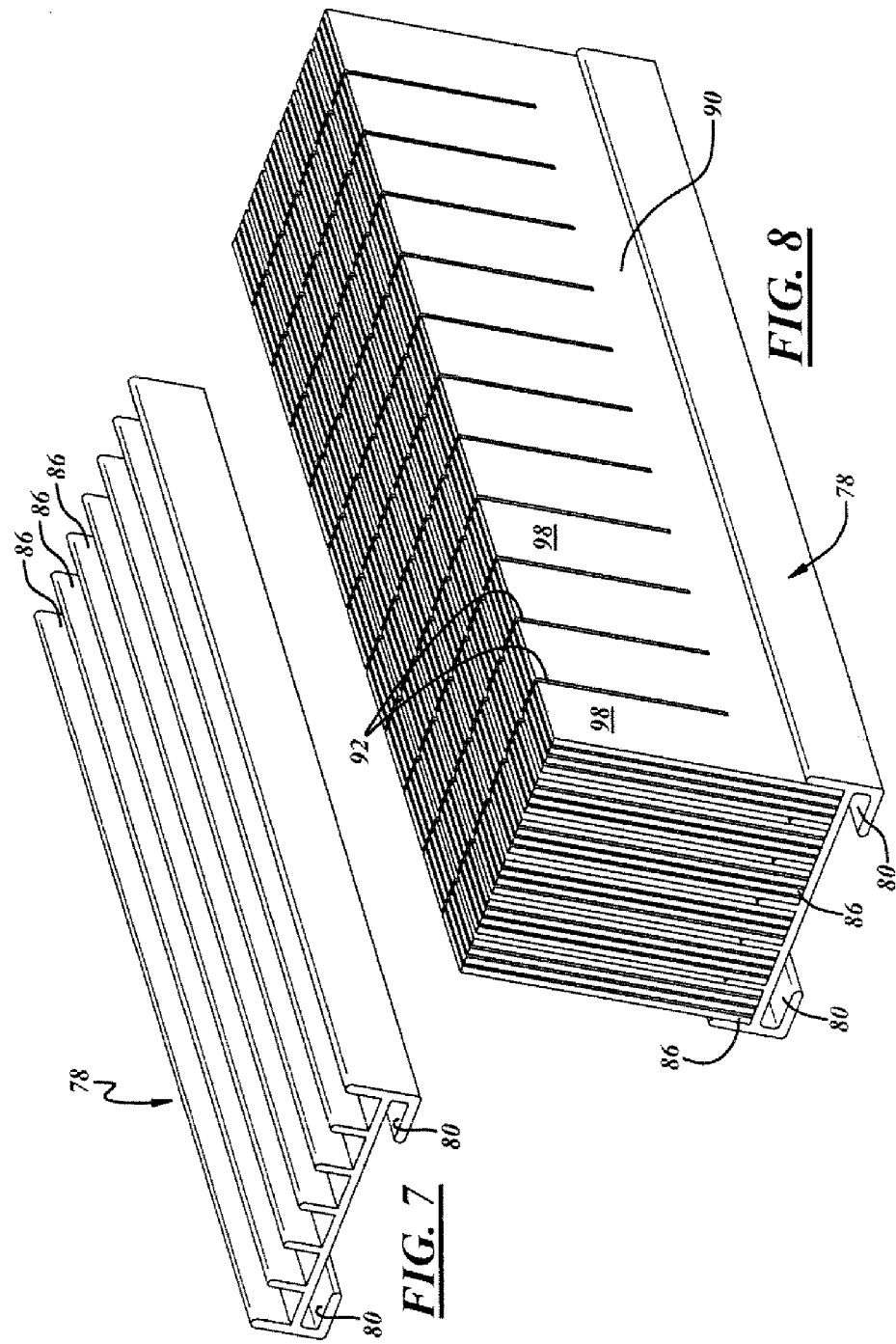

VEHICLE TIRE COATING APPARATUS

CROSS-REFERENCE TO RELATED APPLICATIONS

The present application is a continuation of U.S. application Ser. No. 11/961,862, entitled "Vehicle Tire Coating Apparatus", which was filed on Dec. 20, 2007, now U.S. Pat. No. 8,424,480, and which claims priority to U.S. Provisional Patent Application Ser. No. 60/888,422, filed Feb. 6, 2007 and entitled "Vehicle Tire Coating Apparatus".

TECHNICAL FIELD

The present invention relates generally to a tire coating apparatus for a vehicle washing system. More particularly, the present invention relates to a tire coating apparatus and method for a vehicle washing system that automatically applies a coating fluid to vehicle tires when selected as part of a vehicle wash by a patron.

BACKGROUND OF THE INVENTION

It is well known in the vehicle washing industry to perform various automated steps during the vehicle washing process as the vehicle is conveyed through a washing facility or as the vehicle washing system moves or translates with respect to the vehicle. As is known, such automated steps are designed to wash particular portions of the vehicle. Over the years, numerous advances to such washing facilities have expedited and improved the washing process while decreasing the manpower requirements of the facility. One area where improvements have been focused has been with respect to tire washing apparatus or systems.

Accordingly, many current vehicle washing facilities allow patrons to pay an extra fee, in addition to the fee for the vehicle wash, to have a dressing, coating fluid or the like applied to the vehicle tires to make them more visually attractive. For many years, commercially available coatings have been manually applied to vehicle tires to substantially improve their finish and provide a finishing touch. Obviously, manually applying the coating to the vehicle tires is labor intensive and expensive. As will be appreciated, manual application of the tire coating fluid provides various disadvantages, including inconsistent application of the coating and difficulty in controlling the amount of fluid manually applied to each tire.

In an effort to address the issues and deficiencies of manual application of the tire coating fluid, various types of apparatus and methods have been employed for automatically applying such a coating fluid to the tires after they have been cleaned. One such automatic system involves a tire coating apparatus that automatically applies the coating fluid to the vehicle tires. In this system, the coating fluid is applied by spraying the fluid directly to the vehicle tires through a plurality of spray nozzles as the vehicle passes the tire coating apparatus. Because the tire coating occurs after the vehicle wash, the tire coating apparatus is generally located near the exit of the vehicle washing facility. While this system eliminates the step of manually applying the fluid to the tires, it also has disadvantages.

For example, in the type of system where the coating fluid is applied by spray nozzles to the tires, a large quantity of coating fluid is wasted, as the spray nozzles spray the coating fluid to both the tires and wheels, instead of just the tires. This does not take into account any coating fluid that is sprayed beyond the periphery of the tire, which is also a waste. This obviously increases the material cost of the vehicle washing process. Additionally, once the coating fluid is sprayed onto the vehicle tires in this fashion, the tires typically must be wiped down to smooth out any dripping fluid or to remove any excess fluid. This obviously requires labor either on the part of someone at the vehicle washing facility or on the part of the patron after they leave the facility. Additionally, this system does not necessarily reduce material costs as coating fluid is applied to unnecessary areas.

Other systems have been designed that involve applicator pads, which automatically apply the coating fluid to the vehicle tires. With these systems, the coating fluid is applied first to the applicator pads, which consist of cushion-like foam structures. Thereafter, the applicator pads are positioned such that they are intended to contact the vehicle tires as the vehicle passes through the vehicle washing system to apply the coating fluid to the tires. Utilization of these applicator pads to apply the coating fluid to the tires addresses some of the disadvantages present with the other systems that spray fluid directly to the tires.

Further, as mentioned above, because the coating fluid is applied after completion of the washing process, the applicator pads in these systems are located near the end of the conveying system for the vehicle washing system.

Moreover, many of the tire coating mechanism that utilize applicator pads, are intended to reciprocate between a tire contacting position and a retracted position depending upon whether the additional fee for the tire coating process has been paid for by the patron. However, because the vehicles do not always pass down the conveyor in a straight line and often wander to one side of the system or the other, some vehicles that have not paid the additional fee for the separate tire coating process can inadvertently contact the tire coating mechanism with its tires on one side of the vehicle. This can cause the pads one side of the tire coating mechanism to wear prematurely. This also increases the expense of the system and decreases its longevity. This is also undesirable, as some patrons do not want the tire coating service. Moreover, in in-bay washing systems where patrons can drive through the vehicle wash system, which is unattended, patrons sometimes drive through twice favoring the opposite sides of the vehicle in order to receive the tire coating services at no charge.

Therefore, a need exists for a tire cleaning and finishing system that addresses the disadvantages present with existing systems.

SUMMARY OF THE INVENTION

It is therefore one advantage of the present invention is to provide a tire coating apparatus that minimizes inadvertent contact of a vehicle tire with the apparatus, such as when a patron has not paid an additional fee for receipt of a tire coating process.

It is a related advantage of the present invention to provide a tire coating apparatus that increases the longevity of coating applicators that apply a coating fluid to the tires due to the reduction in inadvertent contact with vehicle tires.

It is another advantage of the present invention is to provide a tire coating apparatus with coating applicators that are configured in smaller segments and are thus readily interchangeable and easily replaced.

It is yet another advantage of the present invention is to provide a tire coating apparatus with coating applicators that can be rotated between a coating application position and a non-coating application position.

It is still yet another advantage of the present invention to provide a tire coating apparatus with coating applicators that simulates a conveyor guide rail for vehicle tires when disposed in a non-coating application position.

It is still a further advantage of the present invention to provide a tire coating apparatus that is controllable to automatically rotate the coating applicators away from a tire coating application position after engagement with the vehicle tires.

In accordance with the above and the other advantages of the present invention, a tire coating apparatus is provided. The tire coating apparatus is intended for application of coating fluid to vehicle tires in a vehicle washing system when selected by a patron. The tire coating apparatus includes a pair of mechanical applicators, which each include one or more coating applicator brushes disposed thereon for contacting the vehicle tires to apply a coating fluid thereto when selected by a patron. One mechanical applicator includes one or more coating applicator brushes that are intended to contact the tires on a right side of a vehicle while the other mechanical applicator includes one or more coating applicator brushes that are intended to contact the tires on a left side of the vehicle. The mechanical applicators also include a guide portion for contacting and guiding the vehicle wheel when a patron had elected not to have a coating fluid applied to the vehicle wheels. The mechanical applicators are rotatable between an initial position where the coating application brushes are in a non-coating position to a second position where the coating applicator brushes are intended to contact a vehicle tire. After the coating application brushes contact the vehicle tires, they then return to the initial non-coating position and a second position where the coating applicator brushes are in a non-coating position.

In accordance with another advantage of the present invention, each mechanical applicator includes a plurality of coating applicator brush segments disposed thereon. Each of the coating applicator brush segments is in sliding engagement with the mechanical applicator. This allows the coating applicator brush segments to be individually removed from the mechanical applicator by sliding it off. The coating applicator brush segments thus can be individually replaced or the relative position of each of the coating applicator brushes on the mechanical applicators can be changed or altered as desired. Further, the coating applicator brush segments can be disposed on the mechanical applicators without the need for fasteners.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention:

FIG. 6 is a perspective view of a left side of a tire coating apparatus for contacting tires on a left side of a vehicle and including a mechanical applicator in a position fully rotated away from a vehicle tire contacting position to a non-coating position, in accordance with one embodiment of the present invention;

FIG. 7 is a perspective view of a backing plate for a coating applicator brush segment in accordance with one embodiment of the present invention;

FIG. 8 is a perspective view of a coating applicator brush segment in accordance with one embodiment of the present invention;

DETAILED DESCRIPTION OF THE INVENTION

Figure 1:
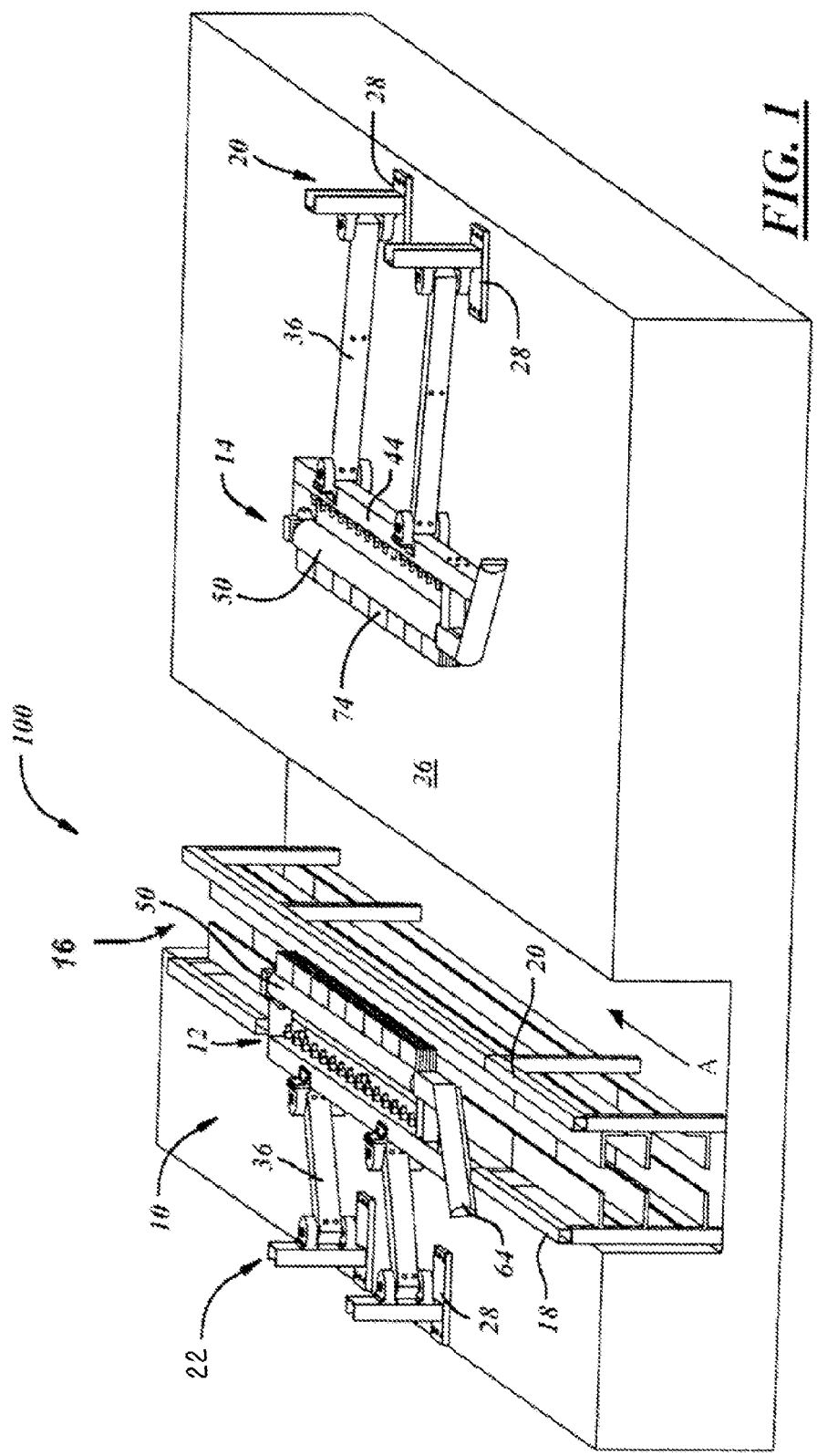
FIG. 1 is a schematic illustration of a portion of a vehicle washing system, including a tire coating apparatus with the coating applicators in a position to contact the vehicle tires, in accordance with one embodiment of the present invention.
Figure 2:
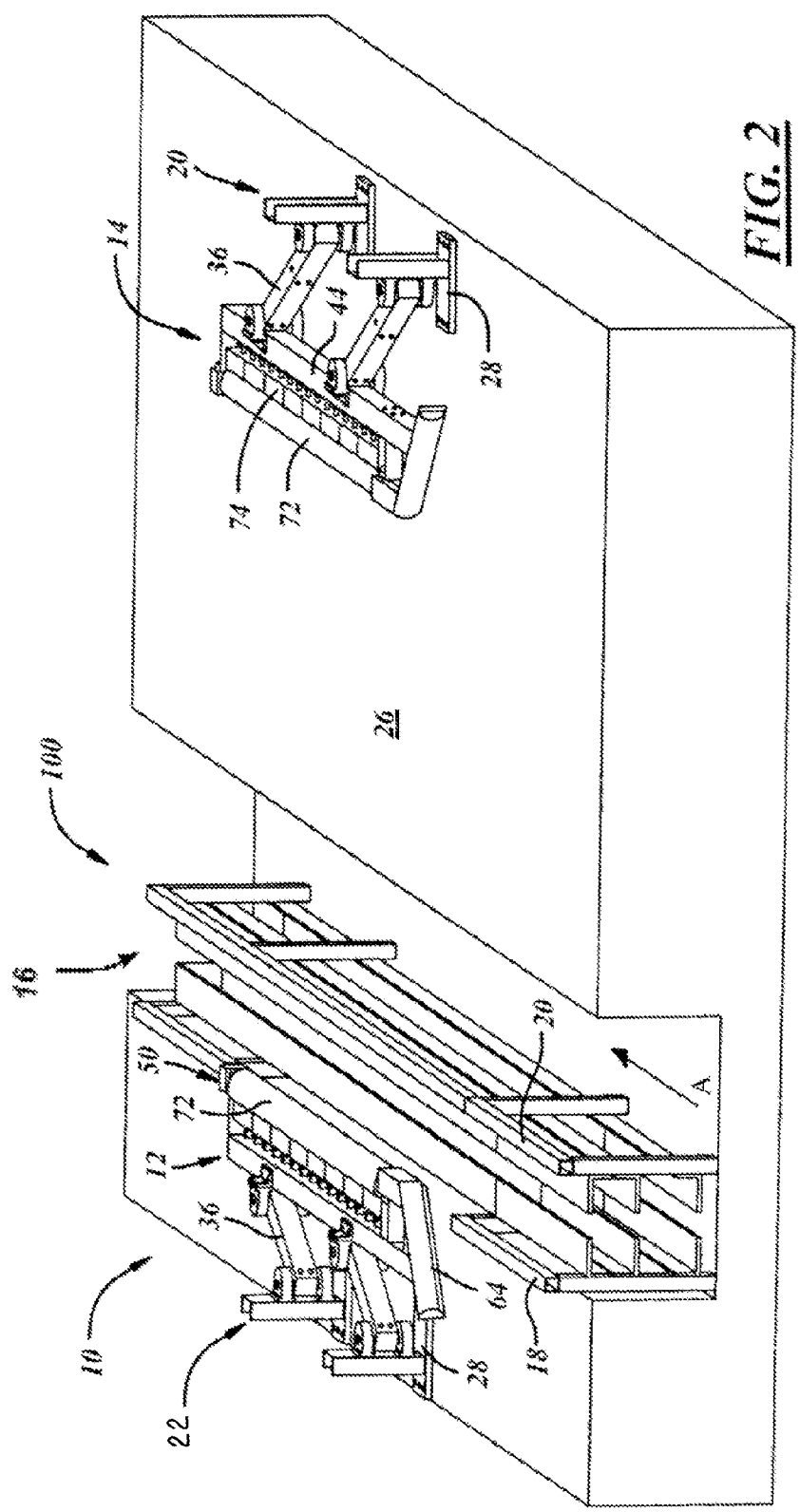
FIG. 2 is a schematic illustration of a portion of a vehicle washing system, including a tire coating apparatus with the coating applicators in a non-coating position, in accordance with one embodiment of the present invention.
Figure 3:
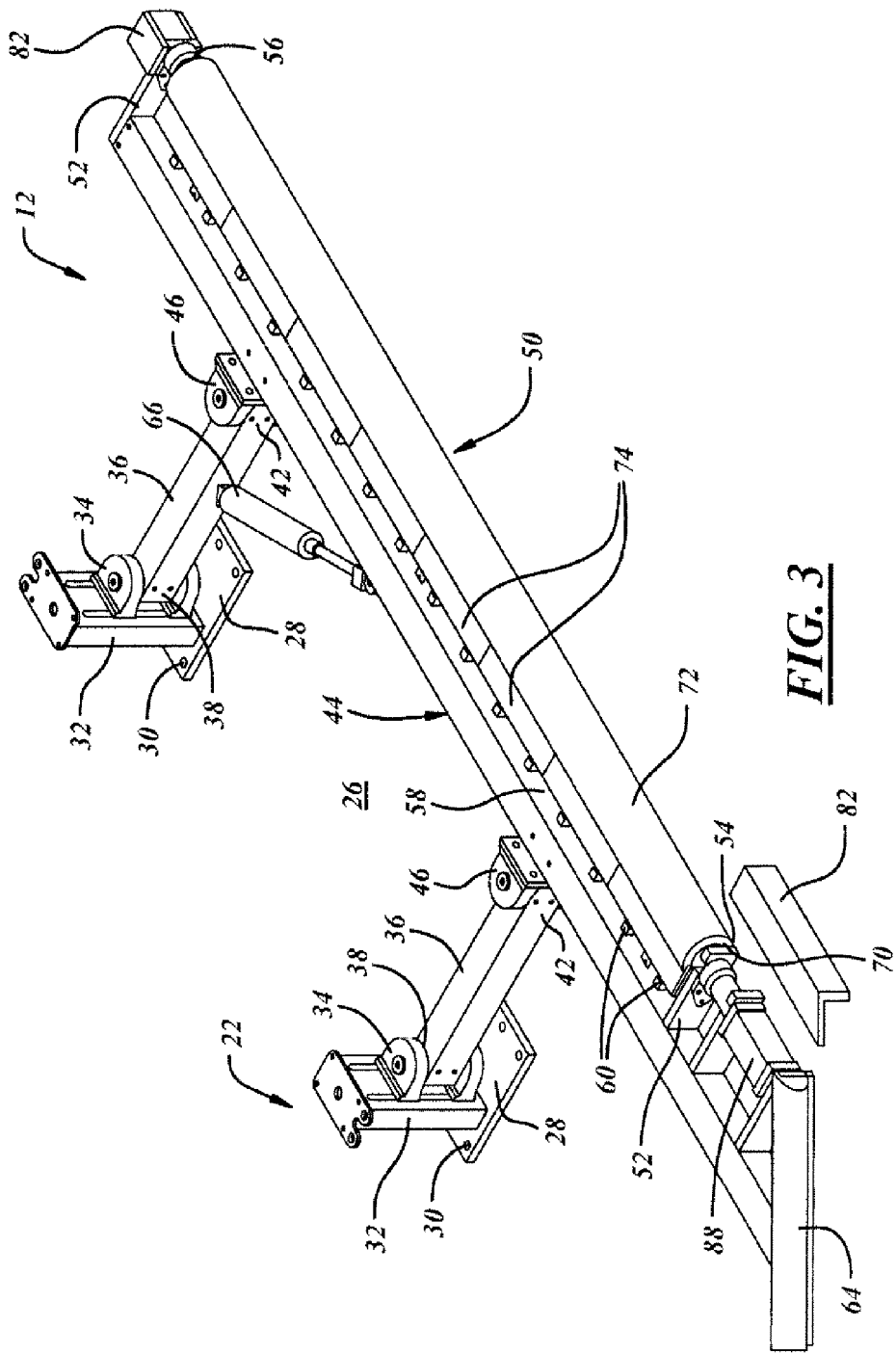
FIG. 3 is a partially exploded perspective view of a left side of a tire coating apparatus for contacting tires on a left side of a vehicle and including a mechanical applicator in a non-coating position, in accordance with one embodiment of the present invention.

Referring now to the Figures, which illustrate various embodiments of a tire coating apparatus 10 in accordance with the present invention. As shown in FIGS. 1 and 2, the tire coating apparatus 10 is incorporated as part of a vehicle cleaning or washing system 100 in which a vehicle is moved through the vehicle washing system 100 by means of a conveyor, as is well known in the art. The tire coating apparatus 10 includes a left side applicator 12 and a right side applicator 14, which cooperate to apply a coating fluid to sidewalls of left and right tires of a vehicle. In accordance with a preferred embodiment of the invention, the vehicle is conveyed through the vehicle washing system 100 along a track 16 between guide rails 18, 20, as is well known in the art. The vehicle is conveyed along the track 16 between rails 18, 20 in the direction generally indicated by the arrow A.

The vehicle washing system 100 includes an arrangement of components, including a computer control system and conveying equipment (not shown), which are considered well known in the art. The control system is used by the washing system to, among other things, monitor and determine the exact position of the vehicle on the track 16. It is intended that the present invention utilize the existing computer control system of the vehicle washing system 100 to initiate application of the coating fluid as well as movement of the left side and right side applicators 12, 14, as discussed below. It will be understood that while the present invention is illustrated and described in connection with a conveyor-type vehicle washing system, it could also be utilized in an in-bay or automatic-type vehicle washing system.

FIG. 1 illustrates the tire coating apparatus 10 in a tire contacting position. In the tire contacting or coating position, the left side applicator 12 and the right side applicator 14 are moved inwardly such that the left side applicator 12 is disposed between the guide rails. In this position, the vehicle tires will engage the coating applicator brushes, as discussed in more detail below. In FIG. 2, the left side applicator 12 and the right side applicator 14 have been retracted such that they are not intended to engage the vehicle tires. In this position, the coating applicator brushes have been rotated away from a coating application position and instead the rear side of the applicators 12, 14 serve as a vehicle guide rail, as discussed in more detail below. As shown in FIG. 2, the left side applicator 12 is retracted such that it aligns with the guide rail 18. In operation, the tire coating apparatus 10 starts in the position shown in FIG. 2 until moved by the control system to the position shown in FIG. 1. Then after the coating apparatus 16 contacts the vehicle tires, it returns to the initial position shown in FIG. 2.

The left side applicator 12 and the right side applicator 14 are substantially identical in construction; and therefore, only the left side applicator 12 of the tire coating apparatus 10 will be described in detail. It will be understood that the description of the left side of the tire coating apparatus 10 applies equally to the right side. Referring now to FIGS. 1 through 6, it is understood that all of the parts illustrated as well as the functionality shown are found in both the left and right side applicators 12, 14. Specifically, the left side applicator 12 includes a pair of base structures 22 that allow the left applicator 12 to be mounted to the floor 26 of the vehicle washing facility and therefore prevent movement when contacted by a vehicle. While two base structures 22 are shown and described, it will be understood that more or less base structures 22 may be utilized to mount the left side applicator 12 to the floor. Each of the base structures 22 includes a base plate 28 that is secured directly to the ground such as by a plurality of bolts 30. Obviously, other securing mechanisms may alternatively be utilized. Each base structure 22 includes a support post 32 that extends upwardly from the base plate 28. It will be understood that the base plate 28 and the support post 32 can be formed as separate components or instead can be formed as a single component. Alternatively, the support post 32 could be secured directly to the ground. Additionally, a cross beam (not shown) may be included that extends between and connects the base structures 22 to provide additional support.

Each support post 32 extends upward from the respective base 28 in a generally perpendicular direction and allows pivotal attachment of a support arm 36 to the support post 32. As shown, in one embodiment, a first end 38 of the support arm 36 engages the attachment mechanism 34, such as by an axle or bolt connection adjacent the first end 38. In accordance with one embodiment, the attachment mechanism 34 is preferably a pivot bearing, the operation and configuration of which will be understood by one of ordinary skill in the art. The support arm 36 also includes a second end 42 that is pivotally attached to a beam portion 44. The second end 42 of the support arm 36 is secured to a backside of the beam portion 44 by an attachment mechanism 46 that allows pivotal attachment of the support arm 36. In one embodiment, the second end 42 of the support arm 36 engages the attachment mechanism 46, such as by an axle or bolt connection adjacent the second end 42. Again, the attachment mechanism 46 is also preferably a pivot bearing. It will be understood by one of ordinary skill in the art that a variety of different attachment mechanism can be utilized, including non-pivotal attachment mechanism or other forms of pivotal attachment. Further, the actual mechanism for attachment can take on a variety of different configurations and forms.

Figure 11:
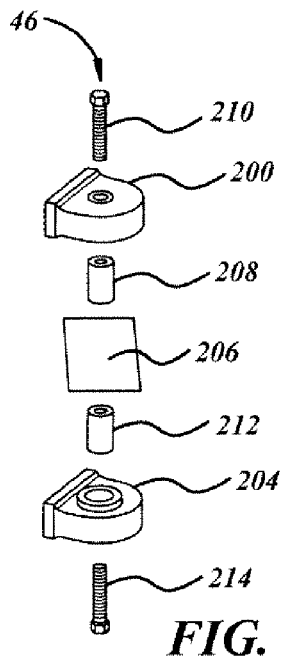
FIG. 11 is an exploded view of an attachment mechanism for a tire coating apparatus in accordance with one embodiment of the present invention.

FIG. 11 illustrates a preferred embodiment of the attachment mechanism 46 in accordance with the present invention. The attachment mechanism 46 includes an upper bearing portion 200 and a lower bearing portion 204. A block 206 is fitted within the interior of the support arm 36. The upper bearing portion 200 engages the upper surface of the support arm 36. An upper shaft 208 engages an undersurface of the upper bearing portion 200 and extends inwardly into engagement with the block 206. The upper bearing portion 200 is secured to the upper shaft 208 and the block 206 by a bolt 210.

The lower bearing portion 204 engages the lower surface of the support arm 36. A lower shaft 212 engages an upper surface of the lower bearing portion 204. A lower shaft 212 engages an upper surface of the lower bearing portion 204 and extends inwardly into engagement with the block 206. The lower bearing portion 204 is secured to the lower shaft 212 and the block 206 by a bolt 214. This configuration allows for easy replacement of the attachment mechanism in the event of failure without having to replace the entire arm 36.

As shown, a coating applicator 50 is coupled to the beam portion 44 by a plurality of frame supports 52. In one embodiment, the frame supports 52 extend outwardly from the beam portion 44 and are coupled to either end 54, 56 of the coating applicator 50, as discussed in more detail below. It will be understood that the coating applicator 50 can be coupled to the beam portion 44 in a variety of suitable ways. The beam portion 44 has a front surface 58 with a plurality of nozzles 60 secured thereto. The nozzles 60 are intended to emit a tire coating fluid therefrom and onto the front surface of the coating applicator 50, as discussed in more detail below. Alternatively, the nozzles could be configured in order to spray the coating fluid into the brush. The nozzles 60 are preferably V-jet spray nozzles; however, a variety of other types of nozzles could be utilized. Further, while fifteen nozzles are included, more or less nozzles may be utilized as desired. The coating fluid can be any suitable fluid, such as a water-based or solvent-based fluid. However, a variety of other suitable fluids for coating vehicle tires may be utilized, as will be understood by one of ordinary skill in the art. Additionally, it will also be understood that the nozzles 60 can be disposed in a variety of different locations to apply coating fluid to the coating applicator 50.

The nozzles 60 are in fluid communication with a fluid supply (not shown) through a fluid manifold 62, and associated piping that conveys fluid from the fluid supply to the fluid manifold 62 and to each of the nozzles 60. The beam portion 44 also has a push bar 64 attached thereto. The push bar 64 is located at the first (entrance) end 54 of the tire coating apparatus 10. The push bar 64 is configured such that if a vehicle tire contacts it, the beam portion 44 of each of the left side applicator 12 and the right side applicator 14 will be pushed back such that the coating applicators 50 match the width of the vehicle as the car travels down the conveyor. This allows the tire coating apparatus 10 to accommodate vehicles having a variety of different wheel base widths. The coating applicator 50 also includes a cylinder 66 that serves as a dampening shock absorber to control inward movement at the beam portion after contact by a vehicle with the push bar 64.

With specific reference to the coating applicator 50, in one embodiment, it consists of a base portion 70, a guide portion 72, and a plurality of individual brush portions 74. In one embodiment, the base portion 70 is pivotally or rotatably attached at either end 54, 56 to the coating applicator 50. The base portion 70 has a front face that is intended to engage one or more brush portions 74. As shown, the base portion 70 has eight brush portions 74 disposed thereon that extend outwardly toward the vehicle with respect to the base portion 70 in order to engage a vehicle tire. In one embodiment, each of the brush portions 74 is one foot in length. While eight separate brush portions or segments are shown, more or less may be utilized as desired. Further, the brush portions 74 can have various different lengths.

Each of the brush portions 74 is slideably received on or over the front face of the base portion 70. In one embodiment, the brush portions 74 each include a backing plate 78 (FIG. 7) that has rails or flanges 80 on its back surface that fit into slots formed on the base portion 70 to effectuate sliding engagement therebetween. Alternatively, the top and bottom surfaces of the front face can extend upwardly and downwardly respectively to allow the brush portions 74 to engage these flanges in sliding engagement. It will be understood that other suitable methods for effectuating sliding engagement may also be utilized. The sliding relationship allows each of the brush portions 74 to be readily moved onto and off the base portion 70 for replacement purposes or other purposes as desired by the proprietor the vehicle wash facility. The slideably engagement between the brush portions 74 and the front face of the coating applicator 50 also allows the relative location of the brush portions 74 with respect to one another to be changed. For example, the wear on the first brush portions 74 is greater than the other brush portions. Thus, an operator can readily move the location of the brush portions in an effort to distribute wear and prolong their life. In a preferred embodiment, the brush portions 74 merely engage the front face and do not require fasteners for securing purposes. To remove the brush portions 74 from the base portions, end portions 82 are removed as are end caps 84 located on either end 54, 56 of the coating applicators 50 to allow the brush portions 74 to be slid off the front face as desired. Disposed under each end cap 84 is a rotary actuator 88 that rotates the coating applicator 50.

As shown in the Figures, the plurality of brush portions 74 consist of a plurality of sheets of non-woven material, such as cloth or the like. In other words, each of the brush portions 74 includes rows of non-woven material that are secured to and extend from the front face of the base portion 70 to contact the vehicle tires. The non-woven portions are preferably disposed in channels or slots 86 on the front face and are secured thereto by an epoxy or other suitable adhesive. Alternatively, the non-woven portions can be secured within the slots 86 by a mechanical connection or can otherwise be fastened therein.

FIG. 7 illustrates the backing plate 78 of the brush portion 74. As discussed above, the rear surface of the backing plate 78 includes flanges or rails 80 that slideably engage the front surface of the base portion 70. The front surface of the backing plate 78 includes channels 86 that receive the non-woven material therein. In the embodiment shown in FIG. 8, the brush portion 74 includes a plurality of sheets 90 of non-woven material secured within each channel 86. Each of the sheets 90 includes a cut 92 that allows the sheets to have finger portions 98 that can flex and contour to the shape of the vehicle tire.

Figure 9:
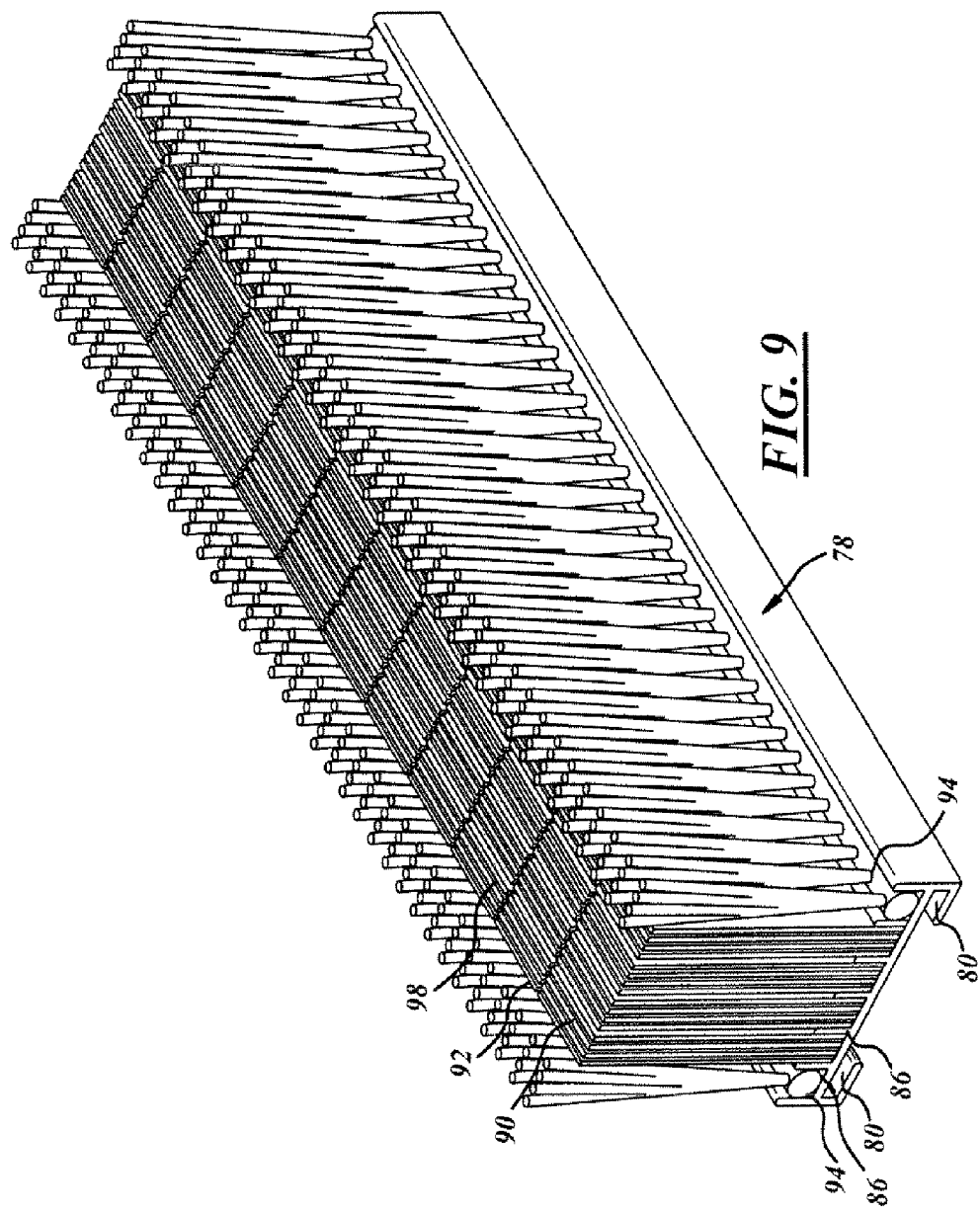
FIG. 9 is a perspective view of a coating application brush segment in accordance with another embodiment of the present invention.
Figure 10:
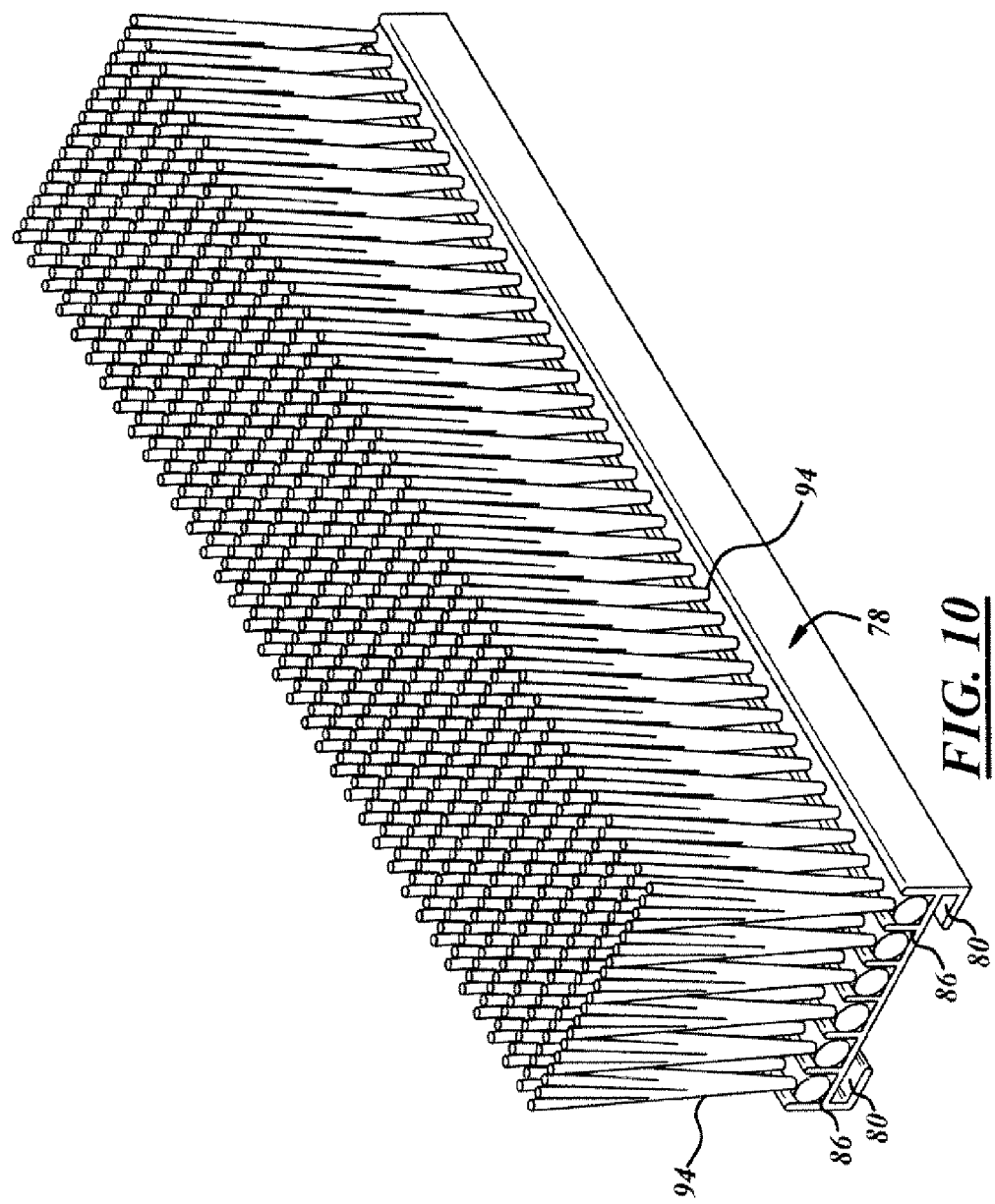
FIG. 10 is a perspective view of a coating applicator brush segment in accordance with still another embodiment of the present invention.

FIG. 9 illustrates another embodiment of the brush portion 74. In this embodiment, the brush portion 74 consists of a plurality of sheets 90 of non-woven material secured in the middle channels 86. However, a row of bristles 94 is disposed in the top and bottom channels 86. FIG. 10 illustrates yet another embodiment of the brush portion with rows of bristles 94 disposed in each of the channels 86. It will be understood that in alternate embodiments, the brush portion 74 could consist of alternating rows of non-woven material and bristles. Further, each channel 86 could consist of a combination of non-woven material and bristles. It will also be understood that other brush configurations may also be utilized.

Further, because the front face of the coating applicator 50 includes a plurality of individual brush portions 74 instead of a single elongated pad or brush, each individual brush portion segment 74 can take on different combinations. For example, in one embodiment, the brush portion 74 closest to the entrance end 54 could consist of an all non-woven material brush (FIG. 7), while the next brush portion 74 could be a combination of a non-woven material and bristles (FIG. 8). The arrangement and order of the differently configured brush portions 74 can also vary as desired.

As set forth above, the coating applicator 50 includes a guide portion 72 that is disposed over and encompasses a large portion of the back of the base portion 70. In one embodiment, the guide portion 70 extends around and covers the portion of the coating applicator that does not have brush portions 74 extending therefrom and preferably has one end secured adjacent an upper portion of the front face and the opposing end secured adjacent a lower portion of the front face. The guide portion 72 is preferably constructed of a plastic material. The guide portion 72 is intended to contact a vehicle tire and act as a guide for the tire when the coating applicator 50 is in a non-coating position. In this position, as shown in connection with FIG. 2, the guide portion 72 aligns with the guide rail 18 to prevent damage to the vehicle wheels and tire in the event it inadvertently contacts the guide portion 72. Further, because the brush portions 74 are rotated away, the tire does not contact them and thus unnecessary wear on the brush portions 74 is minimized. Obviously, other types of materials may be utilized for the guide portion 72 that are sufficient to act as a guide and also prevent damage to the vehicle wheels and tires.

Referring now to the FIGS. 1 through 6, which illustrate the operation of the tire coating apparatus 10, in accordance with the present invention. Initially, as shown in FIG. 1, the coating applicators 50 are positioned such that the brush portions 74 extend generally outwardly. In this position (a tire contacting position), the brush portions 74 are intended to contact vehicle tires as they pass the coating apparatus to apply a coating fluid thereto. In this position, the guide portion 72 is disposed opposite the brush portions 74 and is not intended to contact a vehicle tire. As discussed above, the initial or default position is the non-coating position. The system rotates the coating applicators 50 into a tire contacting position before returning them to the non-coating position. The control system rotates the coating applicators 50 to this position, which is the default position, such that coating fluid can be applied to the brush portions 74 for application to a vehicle that has selected or paid for the tire coating process. As will be understood and as is discussed below, the coating fluid is applied to the brush portion 74 prior to them engaging the vehicle tires so that the coating fluid is applied thereto for application to the tires.

Figure 4:
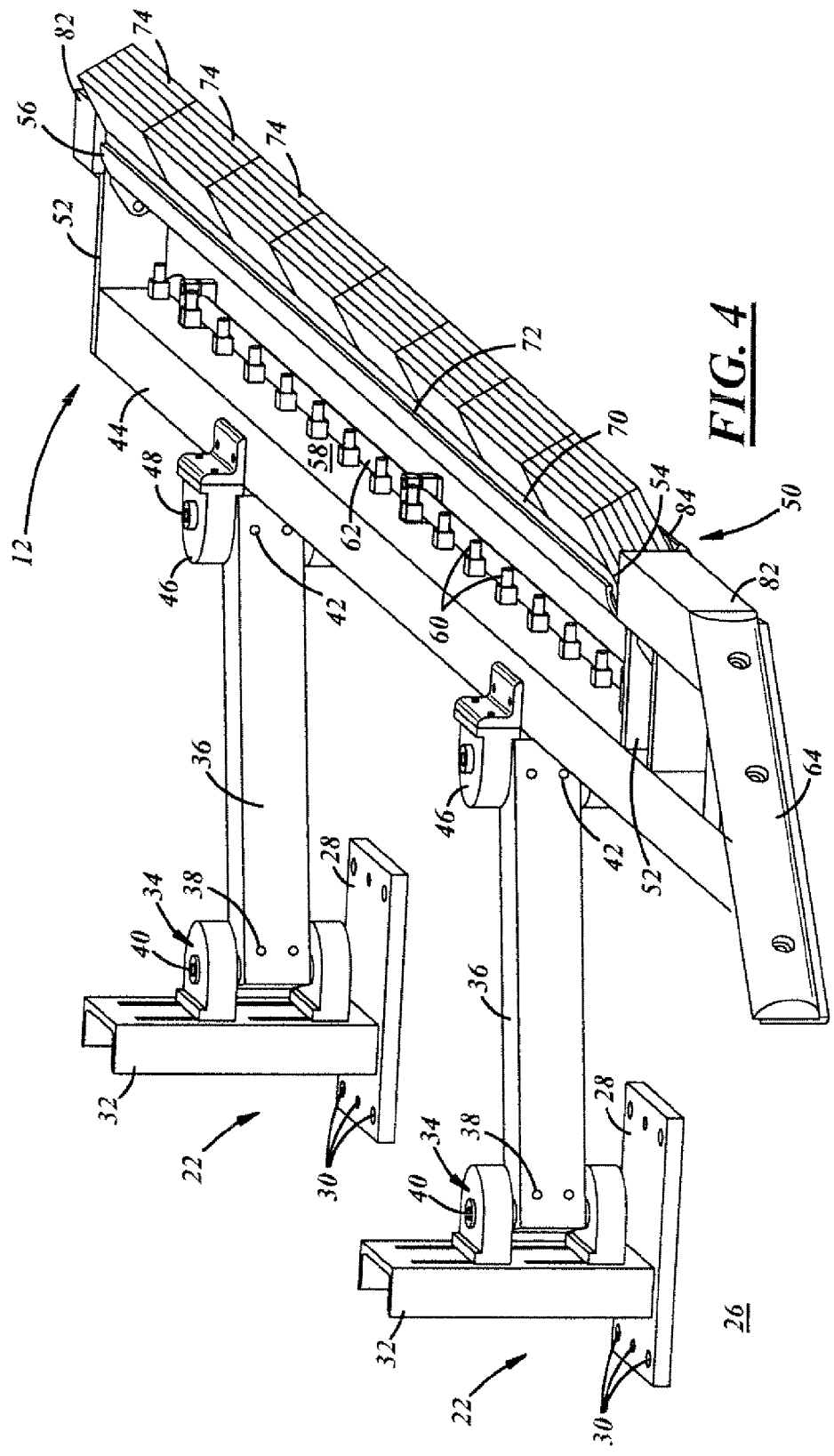
FIG. 4 is a perspective view of a left side of a tire coating apparatus for contacting tires on a left side of a vehicle and including a mechanical applicator in a position partially rotated away from a vehicle tire contacting position, in accordance with one embodiment of the present invention.

Next, as shown in FIG. 4, the control system actuated the rotary actuator 82 to rotate the coating applicator 50 slightly away from a tire engaging position, such that the brush portions 74 are extending upward at a slight angle. It will be understood that FIG. 4 is an intermediary position that is shown to illustrate the rotation of the coating applicator 50 in accordance with the present invention. The rotation of the coating applicator 50 occurs based on direction from the control system. The control system will direct rotation of the coating applicator 50 as soon as the tire coating process has been completed on a vehicle as determined by the control system in order to move the brush portions 74 out of contact with the vehicle tires. The control system will also direct rotation of the coating applicator 50 such that the brush portions 74 receive coating fluid thereon when an upcoming vehicle is directed to receive the tire coating process.

Figure 5:
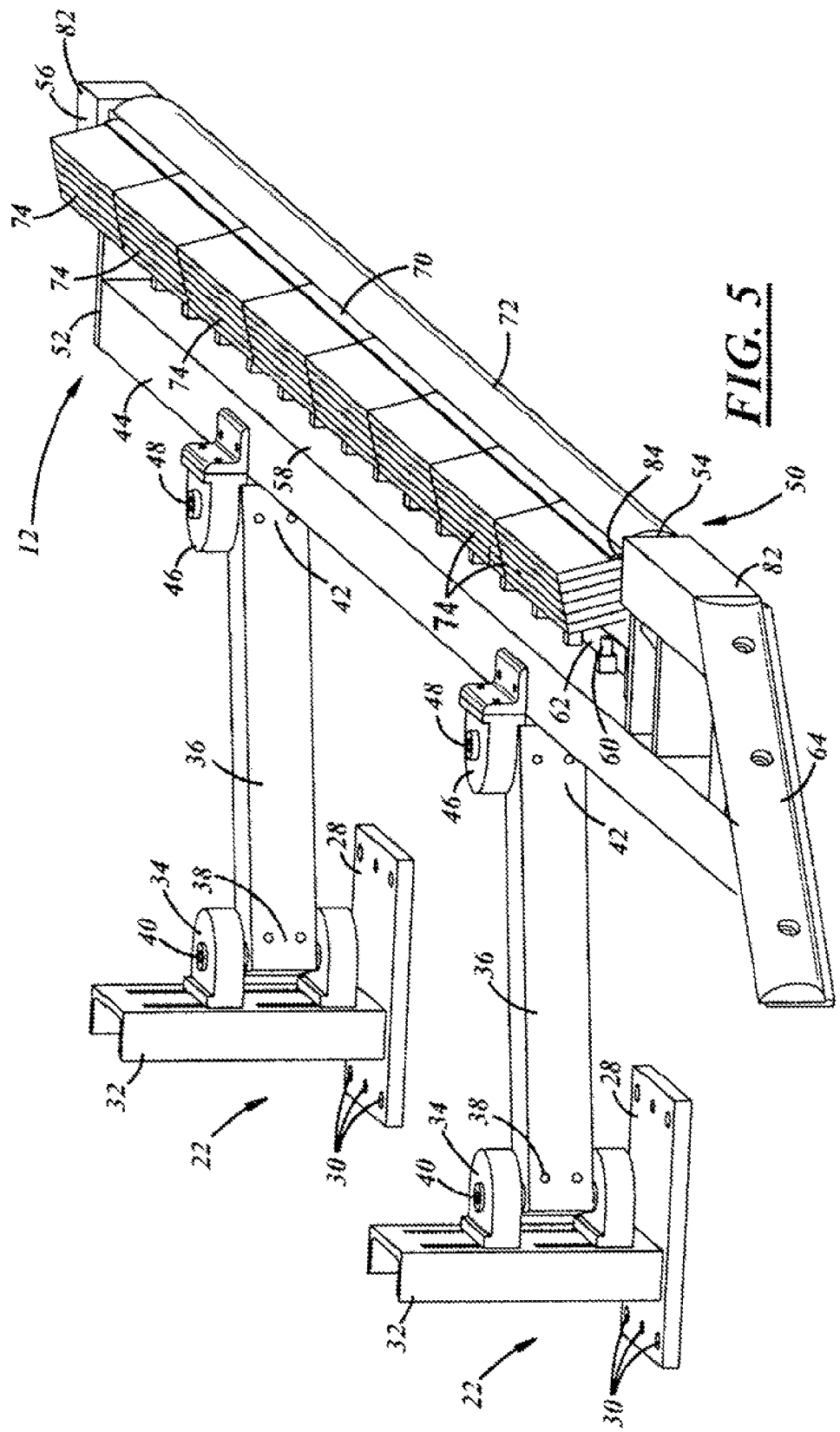
FIG. 5 is a perspective view of a left side of a tire coating apparatus for contacting tires on a left side of a vehicle and including a mechanical application in a position rotated further away from a vehicle tire contacting position than that shown in FIG. 4, in accordance with one embodiment of the present invention.

As shown in FIG. 5, the coating applicator 50 has been rotated further such that the brush portions 74 are extending substantially upward. In this position, the brush portions 74 have been moved out of a tire contacting position. Again, the movement of the control applicator 50 is directed by the control system. In this position, the housing portion 72 is disposed adjacent the guide rail 18 such that a vehicle tire to the extent the vehicle strays off course will contact the guide portion 72. This is because the guide portion 72 extends further outward toward the vehicle tire, in this position, than any other portion of the tire coating apparatus 10, including the brush portions 74. The coating applicator 50 is directed to this position when an upcoming vehicle is not intended to receive the tire coating process. This prevents unnecessary wear on the brush portions 74 and also minimizes inadvertent contact by the brush portion 74 with the vehicle tires.

Lastly, as shown in FIGS. 2 and 6, the coating applicator 50 has been rotated 180 degrees such that the brush portions 74 are in a position to communicate with the plurality of nozzles 60. In this coating fluid position, the nozzles 60 can apply the coating fluid to the brush portions 74 for application to the vehicle tires. It will be understood that the rotation of the coating applicator 50 to this position again occurs under the direction of the control system. Thus, the control system can rotate the coating applicator 50 from a tire contacting position where coating fluid is applied to the vehicle tires (FIG. 1), to a position where the guide portion 72 acts as a guide rail for a vehicle tire and prevents inadvertent contact between the tires and the brush portions 74 (FIGS. 3 and 6) and also prevents damage to the vehicle wheel or tires in the event of inadvertent contact therewith. When the coating applicator 50 is in this position, coating fluid is applied to the brush portions 74 by the nozzles 60. In accordance with the control system, the primary position for the coating applicator 50 is that shown in FIGS. 3 and 6. However, when the coating application process has been selected, coating fluid is applied to the brush portions 74 and then the control system rotates the coating applicator 50 into a tire contacting position. After the coating has been applied to the tires, the coating applicator 50 returns to its starting position as determined by the control system.

As will be understood, the rotation of the coating applicator 50 and thus the brush portions 74 is controlled by the system controls. In any in-bay wash system, the tire coating apparatus 10 preferably includes a sensor, such as a photo eye or the like, that is located at or near the exit end 56 of the tire coating apparatus 10. The sensor is intended to detect the position of the vehicle. When the sensor determines that the vehicle has cleared the tire coating apparatus 10, the control system automatically rotates the coating applicator 50 to its normal non-coating position, and retracts the applicator away from the vehicle, such that the guide portion 72 is in a tire contacting position. This is desirable because an in-bay wash system does not have a conveyor that moves the vehicle through the system and which allows the control system to operate the various other control mechanism. By rotating the guide portion 72 into a tire contacting position, it helps protect the brush portions 74 and the coating applicator 50 from damage due to contact with a vehicle that back up unexpectedly. It also prevents damage to the vehicle wheels and tires. Moreover, it prevents a patron from having the vehicle tires on only one side subjected to the coating process and also prevents a patron from receiving a free treatment by driving through multiple times to receive a coating on the tires on both sides of the vehicle.

Figure 12:
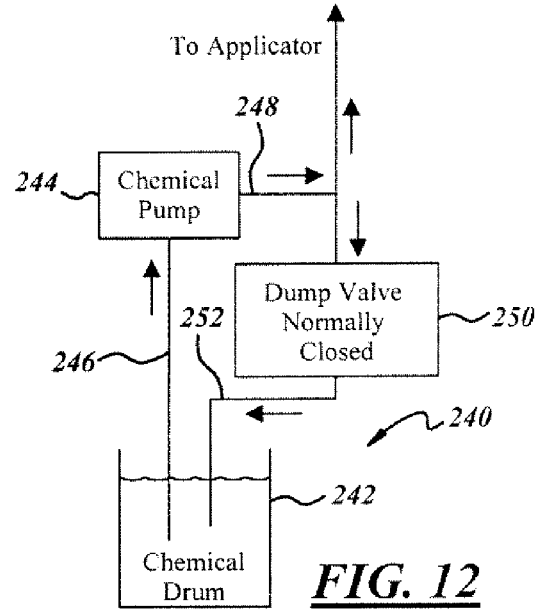
FIG. 12 is a schematic illustration of a dump valve assembly for a single pump system for use in delivering fluid, such as in connection with a tire coating apparatus in accordance with an embodiment of the present invention.
Figure 13:
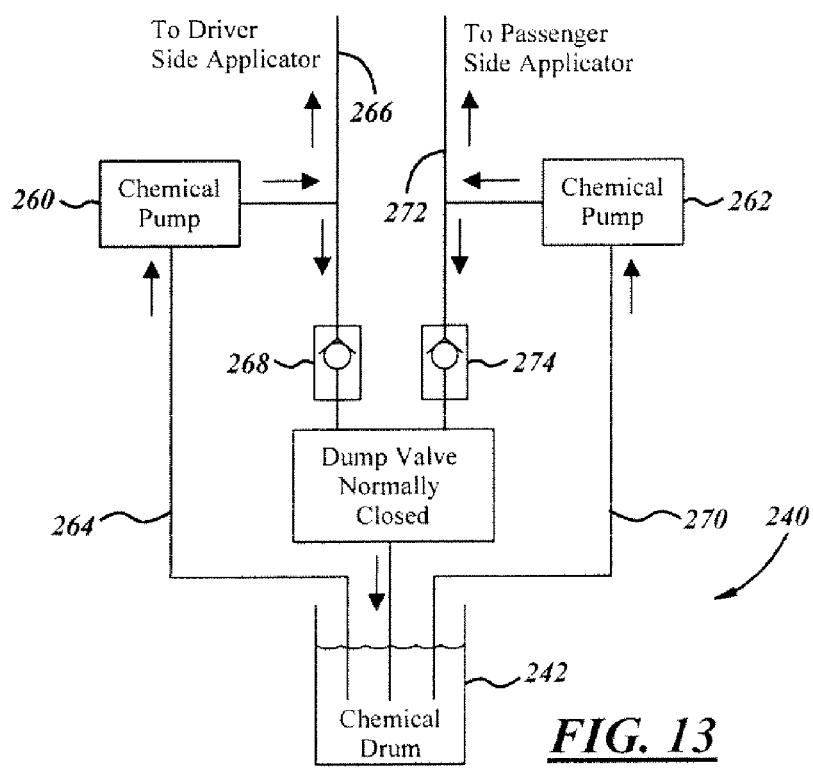
FIG. 13 is a schematic illustration of a dump valve assembly for a dual pump system for use in delivering fluid, such as in connection with a tire coating apparatus in accordance with an embodiment of the present invention.

Referring now to FIGS. 12 and 13, which illustrated a dump valve assembly 240 in accordance with an embodiment of the present invention. The dump valve assembly 240 is disposed adjacent the fluid source 242 that is delivered to the left and ride side applicators 12, 14 for application to the vehicle tires. The fluid source 242 preferably is a tire coating chemical, as will be understood by one of ordinary skill in the art.

As shown in FIG. 12, a fluid pump 244 is in communication with the fluid source 242 to draw the coating fluid therefrom through a first conduit 246. The fluid pump 244 conveys the fluid through a second conduit 248 to both the applicators 12, 14. The dump valve assembly 240 includes a relief valve 250 disposed between the second conduit 248 and the fluid source 242. The relief valve 250 is maintained in a normally closed position, such as when fluid is being conveyed by the fluid pump 244 from the fluid source 242 to the applicators 12, 14. When the flow of fluid has been stopped such that fluid it is not being emitted from the plurality of nozzles 60, the relief valve 250 is opened to allow fluid in the second conduit 248 to flow back to the fluid source 242. Without the relief valve 250, the fluid in the second conduit 248 would escape, such as through the nozzles 60, due to a pressure build up. The escaped fluid would end up on the floor of otherwise be wasted. The relief valve 250 of the present invention allows the pressure to be relieved, which eliminates stress on the system, and prevents waste of coating fluid, by directing it through conduit 252 back to the fluid source 242.

Referring now to FIG. 13, which illustrates a dual pump system embodiment of the dump valve assembly 240. The dual pump assembly 240 includes a first fluid pump 260 and a second fluid pump 262. The first fluid pump 260 draws the coating fluid from the fluid source 242 through a first fluid conduit 264. The first fluid pump 260 conveys the fluid through a second conduit 266 to the left side applicator 12. The dump valve assembly 240 also includes a first relief valve 268 disposed between the second fluid conduit 266 and the fluid source 242. The first relief valve 268 is also maintained in a normally closed position. The first relief valve 268 is opened based on direction from the controller to release pressure in the second fluid conduit 266 and allow it to flow back into the fluid source. Similarly, the second fluid pump 262 draws the coating fluid from the fluid source 242 through a first fluid conduit 270. The second fluid pump 262 conveys the fluid through a second fluid conduit 272 to the right side applicator 14. The dump valve assembly 240 also includes a second relief valve 274 disposed between the second fluid conduit 272 and the fluid source 242. The second relief valve is also maintained in a normally closed position. The second relief valve 274 is opened based on direction from the controller to release pressure in the second fluid conduit 272 and allow it to flow back into the fluid source.

While particular embodiments of the invention have been shown and described, numerous variations and alternate embodiments will occur to those skilled in the art. Accordingly, it is intended that the invention be limited only in terms of the appended claims.

What is claimed is:

1. A system for applying fluid to tires of a vehicle, comprising:
   a pair of opposing moveable assemblies disposed on either side of the vehicle;
   fluid applicator modules coupled to a respective one of each of said pair of opposing moveable assemblies for engaging the tires of the vehicle;
   a supply of tire coating fluid in communication with each of said fluid applicator modules to convey said tire coating fluid thereto;
   each of said fluid applicator modules being moveable between at least a first position and a second position;
   wherein in said first position, said fluid applicator modules are prevented from inadvertently applying said tire coating fluid to the tires of the vehicle;
   wherein in said second position, said fluid applicator modules apply said tire coating fluid to the tires of the vehicle; and
   wherein each of said fluid applicator modules includes a surface that acts as a guide to direct the vehicle tires along a path when said fluid applicators are in said first position.

2. The system of claim 1, wherein each of said fluid applicator modules is rotatably coupled to said respective one of said pair of opposing moveable assemblies.

3. The system of claim 2, wherein each of said fluid applicator modules includes a base portion and a brush portion coupled to said base portion and in said second position said brush portion is intended to contact the tires of the vehicle for applying said tire coating fluid.

4. The system of claim 3, wherein said brush portion consists of a plurality of individual cloth segments.

5. The system of claim 4, wherein said plurality of individual cloth segments each include a plurality of slits formed therein to create a plurality of finger portions that assist in applying said tire coating fluid to the tires of the vehicle.

6. The system of claim 3, wherein said brush portion consists of a plurality of nylon bristles.

7. The system of claim 3, wherein said brush portion consists of a combination of a plurality of individual cloth segments and a plurality of nylon bristles.

8. The system of claim 3, wherein each of said fluid applicator modules includes a guide rail that is intended to contact the tires of the vehicle in said first position.

9. The system of claim 3, wherein said tire coating fluid is applied to each of said brush portions when each of said fluid applicator modules is in said second position.

10. The system of claim 1, wherein each of said fluid applicator modules consists of a plurality of individual segments that extend longitudinally along the length of each of said pair of opposing moveable assemblies.

11. The system of claim 1, further comprising:
    a control system that regulates and effectuates movement of each of said fluid applicator modules between said first position and said second position.

12. A system for applying fluid to tires of a vehicle, comprising:
    a right side assembly disposed on a right side of the vehicle and being moveable toward and away from the tires of the vehicle;
    a left side assembly disposed on a left side of the vehicle and being moveable toward and away from the tires of the vehicle;
    at least one right side fluid delivery device coupled to said right side assembly, said at least one right side fluid delivery device in fluid communication with a supply of tire coating fluid;
    at least one left side fluid delivery device coupled to said left side assembly, said at least one left side fluid delivery device in fluid communication with a supply of tire coating fluid;
    a right side applicator module rotatably coupled to said right side assembly, said right side applicator module including a right side applicator member;
    a left side applicator module rotatably coupled to said left side assembly, said left side applicator module including a left side applicator member;
    said right side applicator module and said left side applicator module each being rotatable between at least a first position wherein said applicator members are prevented from inadvertent contact with the tires of the vehicle and a second position wherein said applicator members are engaging the tires of the vehicle to apply said tire coating fluid thereto;
    wherein said right side applicator module includes a right side base portion and a right side guide rail coupled to said right side assembly and intended to contact the tires of the vehicle in said first position; and
    wherein said left side applicator module includes a left side base portion and a left side guide rail coupled to said left side assembly and intended to contact the tires of the vehicle in said first position.

13. The system of claim 12, wherein each of said right side applicator member and said left side applicator member consists of a plurality of individual cloth segments.

14. The system of claim 13, wherein said plurality of individual cloth segments include a plurality of slits formed therein that create a plurality of finger portions to assist in applying said tire coating fluid to the tires of the vehicle.

15. The system of claim 12, wherein each of said right side applicator member and said left side applicator member consists of a plurality of nylon bristles.

16. The system of claim 12, wherein each of said right side applicator member and said left side applicator member consists of a combination of a plurality of individual cloth segments and a plurality of nylon bristles.

17. The system of claim 12, wherein said right side applicator member and said left side applicator member each consist of a plurality of longitudinally extending individual applicator segments and wherein each of said plurality of individual applicator segments are slideably coupled to a respective one of said right side applicator module and said left side applicator module.

18. The system of claim 12, wherein said right side delivery device consists of a plurality of nozzles for applying said tire coating fluid to said right side applicator member and said left side delivery device consists of a plurality of nozzles for applying said tire coating fluid to said left side applicator member.

19. The system of claim 12, further comprising:
    a control system that regulates and effectuates the rotation of said right side applicator module and said left side applicator module between said first position and said second position.

20. A system for applying fluid to a plurality of tires of a vehicle, comprising:
    a pair of opposing moveable assemblies disposed on either side of the vehicle;

fluid applicator modules coupled to a respective one of each of said pair of opposing moveable assemblies for engaging the tires of the vehicle;

a supply of tire coating fluid in fluid communication with each of said fluid applicator modules to convey said tire coating fluid thereto;

each of said fluid applicator modules being moveable between a first position and a second position;

wherein in said first position, said fluid applicator modules are prevented from inadvertently applying said tire coating fluid to the tires of the vehicle;

wherein each of said fluid applicator modules includes a guide surface that is disposed adjacent to the vehicle tires when said fluid applicator modules are in said first position to direct the vehicle tires along a path in a direction of vehicle travel through the system;

wherein in said second position, said fluid applicator modules are engageable with the tires of the vehicle to apply tire coating fluid thereto; and wherein each of said fluid applicator modules consists of a plurality of individual segments that extend longitudinally along the length of each of said pair of opposing moveable assemblies.

21. The system of claim 20, wherein each of said fluid applicator modules is rotatably coupled to said respective one of said pair of opposing moveable assemblies.

22. The system of claim 21, wherein each of said fluid applicator modules can be selectively rotated at least 90 degrees.

23. The system of claim 21, wherein each of said fluid applicator modules can be selectively rotated at least 180 degrees.

24. The system of claim 21, wherein each of said fluid applicator modules can be selectively rotated in a range of 90 degrees to 180 degrees.

25. The system of claim 20, wherein said plurality of individual segments are slideably coupled to a respective one of said pair of opposing moveable assemblies.

* * * * *